US007579832B1

(12) United States Patent
Blackburn et al.

(10) Patent No.: US 7,579,832 B1
(45) Date of Patent: Aug. 25, 2009

(54) CROSS-DRIVE IMPEDANCE MEASUREMENT CIRCUITS FOR SENSING AUDIO LOADS ON CODEC CHANNELS

(75) Inventors: Jeffrey Blackburn, Lakeway, TX (US); Ajaykumar Kanji, Austin, TX (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 12/137,836

(22) Filed: Jun. 12, 2008

(51) Int. Cl.
*G01V 3/00* (2006.01)

(52) U.S. Cl. ...................................... 324/300; 324/322

(58) Field of Classification Search ......... 324/300–322; 600/407–435; 348/12, 13, 17; 395/309, 395/555
See application file for complete search history.

(56) References Cited

U.S. PATENT DOCUMENTS 6,064,422 A * 5/2000 Goolcharan et al. ...... 348/14.12
6,185,627 B1 2/2001 Baker et al.
6,259,957 B1 * 7/2001 Alexander et al. ............ 700/94
6,509,758 B2 1/2003 Piasecki et al.
6,812,715 B2 11/2004 Chiozzi et al.
7,366,577 B2 4/2008 DiSanza et al.
2004/0081099 A1 4/2004 Patterson et al.
2007/0116303 A1 5/2007 Kanji
2007/0133828 A1 6/2007 Kanji
2007/0133829 A1 * 6/2007 Kanji ......................... 381/123

FOREIGN PATENT DOCUMENTS

EP 1118865 A1 7/2001

OTHER PUBLICATIONS

Patterson et al., U.S. Provisional Application No. 60/391,119, filed Jun. 24, 2002.
IDT Product Brief, "2-Channel, 20-Bit, AC'97 2.3 CODECS with Stereo MIC & Universal Jackson™," 4 pages, Admitted Prior Art.
IDT Analog Specification, "Jack Sense Top—Red River Circuit," 6 pages, Admitted Prior Art.
Sigmatel, STAC9758/59, "AppendiX B: Jack Sense Operation," Admitted Prior Art, pp. 139-143.

* cited by examiner

*Primary Examiner*—Brij B Shrivastav
(74) *Attorney, Agent, or Firm*—Myers Bigel Sibley & Sajovec

(57) ABSTRACT

An audio system includes a CODEC audio jack having left and right audio ports and a jack sense circuit. The jack sense circuit includes left and right amplifiers and a cross-drive impedance sensing circuit. This cross-drive impedance sensing circuit, which is electrically coupled to the left and right audio ports and the left and right amplifiers, detects the resistances of left and right output loads in order to determine characteristics of a device connected to the CODEC audio jack. The cross-drive impedance circuit is configured to measure a resistance of a left output load electrically coupled to the left audio port, in response to a "right" test signal generated by the right amplifier, and is further configured to measure a resistance of a right output load electrically coupled to the right audio port in response to a "left" test signal generated by the left amplifier.

25 Claims, 2 Drawing Sheets

CROSS-DRIVE IMPEDANCE MEASUREMENT CIRCUITS FOR SENSING AUDIO LOADS ON CODEC CHANNELS

FIELD OF THE INVENTION

The present invention relates to integrated circuit devices and, more particularly, to integrated circuit devices used in audio systems having CODEC (coder/decoder) channels therein.

BACKGROUND OF THE INVENTION

Conventional jack sense circuits may be used in plug-and-play solutions on computers and other systems to sense whether an audio jack should be configured as an output or an input depending on what a user has plugged into the jack (e.g., headphone driven load, line out driven load, a microphone input, etc.). Unfortunately, these conventional jack sense circuits may yield relatively large errors in measurement due to transistor mismatching and the use of open-loop architectures, for example. As illustrated by FIG. 1, a conventional jack sense circuit 10 may utilize a proportionally smaller jack sense driver 12 to mirror current provided by an output driver 14 to an output load 16 being measured. This output load 16 may be electrically coupled by an audio jack (not shown) and an ac coupling capacitor 18 to an output pad 20 of an integrated circuit containing the output and jack sense drivers. The mirrored current is provided from an output of the jack sense driver 12 to a string of internal resistors (R1, R2, R3 and R4) having fixed values. A control circuit 22 is also provided to sequentially connect nodes in the resistor string (i.e., voltage division taps) to a non-inverting input of a comparator 24. The inverting input of the comparator 24 is attached to the output pad 20 that is driven by the output driver 14. The control circuit 22 monitors a trip point at the output of the comparator 24 to thereby detect a resistance of the output load 16. Unfortunately, this conventional jack sense circuit 10 may have difficulty distinguishing between loads (e.g., headphones, microphones) having similar resistance characteristics. Additional jack sense circuits are also disclosed in U.S. Pat. No. 7,366,577 to DiSanza et al. entitled "Programmable Analog Input/Output Integrated Circuit System," the disclosure of which is hereby incorporated herein by reference, and in US 2004/0081099 to Patterson et al.

SUMMARY OF THE INVENTION

Embodiments of the present invention include an audio system having enhanced plug-and-play characteristics that may be utilized with universal audio jacks. According to some of these embodiments of the invention, an audio system includes a CODEC audio jack having left and right audio ports and a jack sense circuit, which is electrically coupled to the CODEC audio jack. The jack sense circuit includes left and right amplifiers and a cross-drive impedance sensing circuit. This cross-drive impedance sensing circuit, which is electrically coupled to the left and right audio ports and the left and right amplifiers, is configured to detect the resistances of left and right output loads in order to determine characteristics of a device connected to the CODEC audio jack. In particular, the cross-drive impedance circuit is configured to measure a resistance of a left output load electrically coupled (e.g., by an ac coupling capacitor) to the left audio port, in response to a "right" test signal generated by the right amplifier, and is further configured to measure a resistance of a right output load electrically coupled (e.g., by an ac coupling capacitor) to the right audio port in response to a "left" test signal generated by the left amplifier. The cross-drive impedance sensing circuit may also be configured to disable the left amplifier when measuring the resistance of the left output load and disable the right amplifier when measuring the resistance of the right output load.

According to additional embodiments of the invention, the cross-drive impedance sensing circuit includes a load voltage divider network. This load voltage divider network is configured to establish a left load voltage divider between a drive node of the cross-drive impedance sensing circuit and the left output when the cross-drive impedance sensing circuit is configured to measure the resistance of the left output load. The load voltage divider is also configured to establish a right load voltage divider between the drive node and the right output when the cross-drive impedance sensing circuit is configured to measure the resistance of the right output load. According to further aspects of these embodiments, the cross-drive impedance sensing circuit further includes an internal voltage divider network, which is configured to establish an internal voltage divider between the drive node and a reference terminal, and a comparator having first and second inputs. These first and second inputs of the comparator are electrically connected to a first intermediate node in the internal voltage divider network and a first intermediate node in the load voltage divider network, respectively. The internal voltage divider network may also include a varistor that is varied through multiple trip points when the cross-drive impedance sensing circuit is measuring the resistances of the left and right loads. In still further embodiments of the invention, the cross-drive impedance sensing circuit may include a kill drive resistance network that is electrically coupled to a second intermediate node of the load voltage divider network. This kill drive resistance network may be enabled when the cross-drive impedance sensing circuit is measuring whether the first and second output loads are electrically shorted together.

According to still further embodiments of the invention, an integrated circuit device may include a first driver having a first output and a second driver having a second output. A cross-drive impedance sensing circuit is also provided. The cross-drive impedance sensing circuit is electrically coupled to the first and second outputs of the first and second drivers. This cross-drive impedance sensing circuit is configured to measure a first resistance of a first output load electrically coupled by an ac coupling capacitor to the first output in response to a second test signal generated by the second driver. The cross-drive impedance sensing circuit is also configured to measure a second resistance of a second output load electrically coupled to the second output in response to a first test signal generated by the first driver.

According to some of these embodiments of the present invention, the cross-drive impedance sensing circuit includes a load voltage divider network. This network is configured to establish a first load voltage divider between a drive node of the cross-drive impedance sensing circuit and the first output when the cross-drive impedance sensing circuit is configured to measure the first resistance. The network is also configured to establish a second load voltage divider between the drive node and the second output when the cross-drive impedance sensing circuit is configured to measure the second resistance. The cross-drive impedance sensing circuit may also include an internal voltage divider network, which is configured to establish an internal voltage divider between the drive node and a reference terminal, and a comparator. This comparator has first and second inputs electrically connected to a first intermediate node in the internal voltage divider network and a first intermediate node in the load voltage divider network, respectively.

DETAILED DESCRIPTION OF PREFERRED EMBODIMENTS

Figure 1:
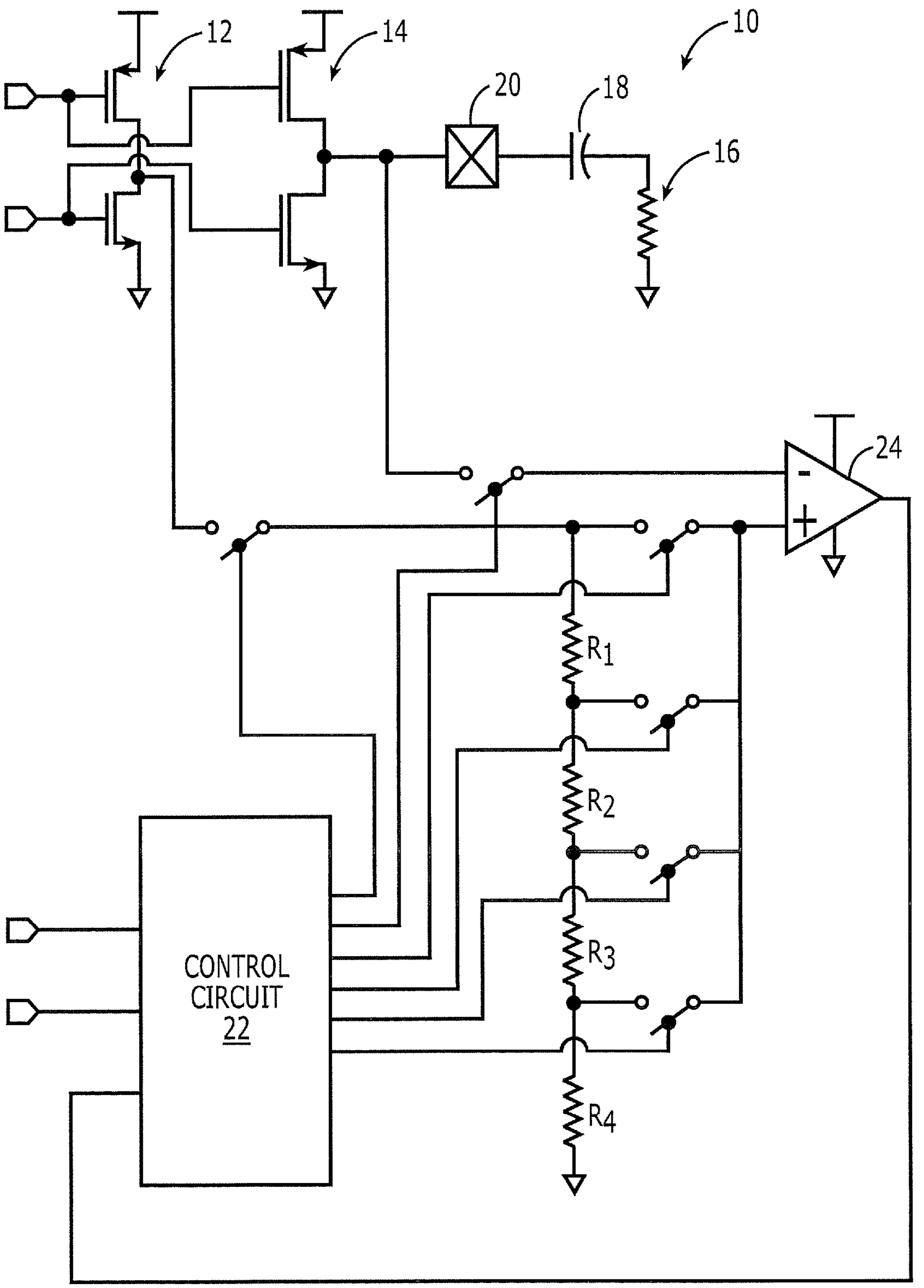
FIG. 1 (PRIOR ART)
FIG. 1 illustrates an electrical schematic of a conventional jack sense circuit.

The present invention now will be described more fully herein with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout and signal lines and signals thereon may be referred to by the same reference characters.

Figure 2:
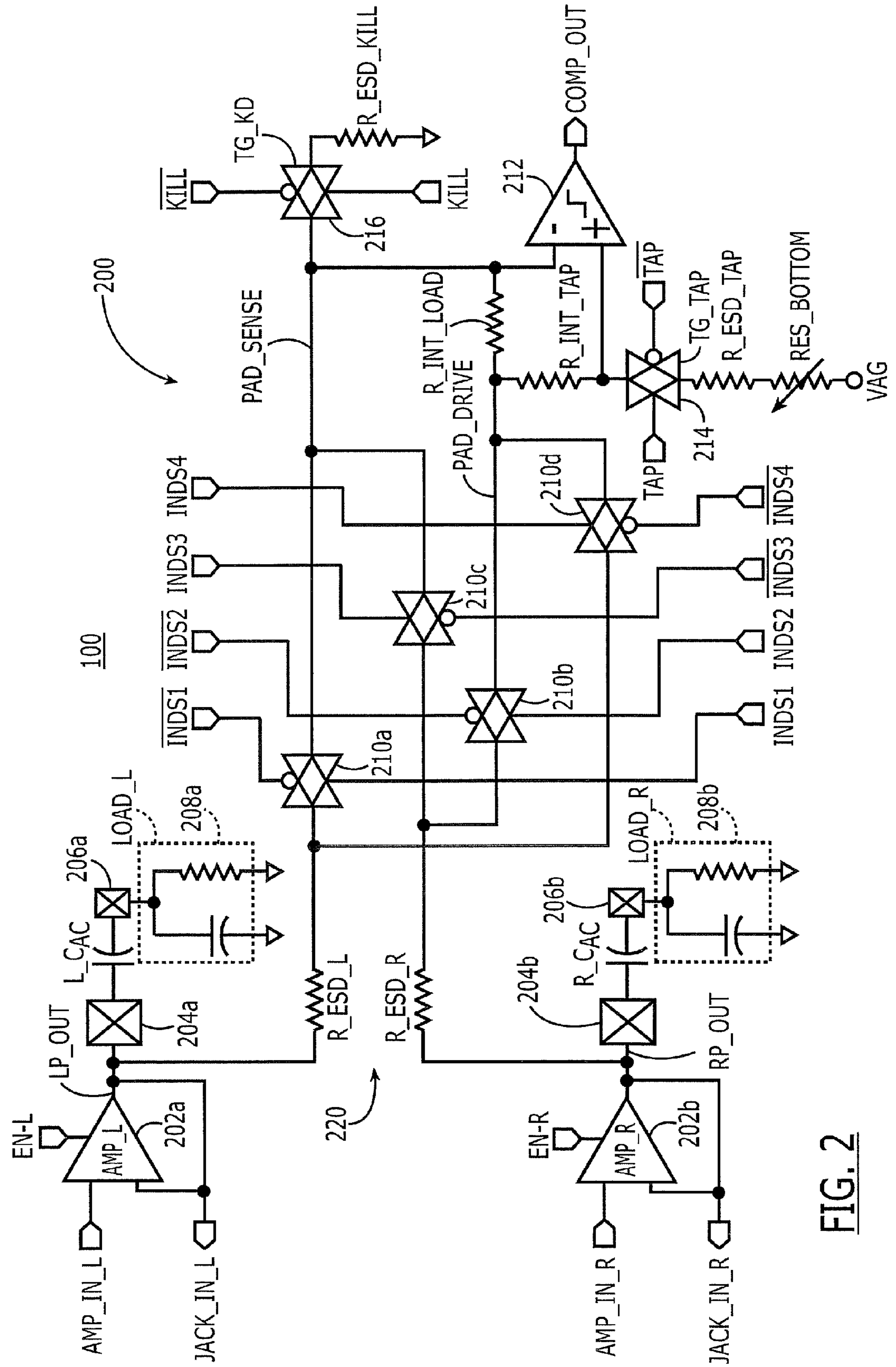
FIG. 2 is an electrical schematic of jack sense circuit according to embodiments of the present invention.

Referring now to FIG. 2, an audio system 100 according to embodiments of the present invention is illustrated as including a CODEC audio jack having a left audio port 206*a* and a right audio port 206*b* therein and a jack sense circuit 200, which is electrically coupled to the CODEC audio jack. The jack sense circuit 200 includes a left amplifier/driver 202*a*, a right amplifier/driver 202*b* and a cross-drive impedance sensing circuit 220. This cross-drive impedance sensing circuit 220, which is electrically coupled to the left and right audio ports 206*a* and 206*b* and the left and right amplifiers 202*a* and 202*b*, is configured to detect the resistances of left and right output loads 208*a* and 208*b* in order to determine characteristics of a device connected to the CODEC audio jack. The electrical coupling between an output of the left amplifier 202*a* and the left audio port 206*a* may be provided through a left terminal/pad 204*a* of an integrated circuit chip (not shown) containing the jack sense circuit 200. As illustrated, this left terminal/pad 204*a* may be electrically coupled by an AC coupling capacitor $L\_C_{AC}$ to the left audio port 206*a*. Similarly, the electrical coupling between an output of the right amplifier 202*b* and the right audio port 206*b* may be provided through a right terminal/pad 204*b*. This right terminal/pad 204*b* may be electrically coupled by an AC coupling capacitor $R\_C_{AC}$ to the right audio port 206*b*. According to some embodiments of the invention, the AC coupling capacitors $L\_C_{AC}$ and $R\_C_{AC}$ may be board mounted capacitors that are electrically coupled to the CODEC audio jack. Moreover, the connection of an input device (e.g., microphone) to the CODEC audio jack may result to the passing of input signals to the input terminals JACK_IN_L and JACK_IN_R within the audio system 100. These input terminals may be connected to input buffers/drivers (not shown).

The cross-drive impedance sensing circuit 220 is configured to measure a resistance of the left output load 208*a* in response to a "right" test signal generated by the right amplifier 202*b*, and is further configured to measure a resistance of a right output load 208*b* in response to a "left" test signal generated by the left amplifier 202*a*. The cross-drive impedance sensing circuit may also be configured to disable the left amplifier 202*a* when measuring the resistance of the left output load 208*a* and disable the right amplifier 202*b* when measuring the resistance of the right output load 208*b*.

According to the embodiments illustrated by FIG. 2, the cross-drive impedance sensing circuit 220 includes a load voltage divider network. This load voltage divider network is configured to establish a left load voltage divider between a common drive node (PAD_DRIVE) of the cross-drive impedance sensing circuit 220 and a left output LP_OUT of the left amplifier 202*a* when the cross-drive impedance sensing circuit 220 is configured to measure the resistance of the left output load 208*a*. Alternatively, the load voltage divider network is configured to establish a right load voltage divider between the common drive node (PAD_DRIVE) and a right output RP_OUT of the right amplifier 202*b* when the cross-drive impedance sensing circuit 220 is configured to measure the resistance of the right output load 208*b*.

The cross-drive impedance sensing circuit 220 also includes an internal voltage divider network, which is configured to establish an internal voltage divider between the common drive node (PAD_DRIVE) and a reference terminal (e.g., VAG), and a comparator 212 having first and second inputs. These first and second inputs of the comparator 212 are electrically connected to a first intermediate node in the internal voltage divider network and a first intermediate node in the load voltage divider network, respectively. The internal voltage divider network may also include a varistor (RES_BOTTOM) that is varied through multiple trip points when the cross-drive impedance sensing circuit 220 is measuring the resistances of the left and right loads.

Moreover, according to additional embodiments of the invention, the cross-drive impedance sensing circuit may also include a kill drive resistance network that is electrically coupled to a second intermediate node of the load voltage divider network. This second intermediate node is shown as the PAD_SENSE node in FIG. 2. This kill drive resistance network may be enabled when the cross-drive impedance sensing circuit 220 is measuring whether the first and second output loads 208*a* and 208*b* are electrically shorted together.

An operation to measure a resistance of the left output load 208*a* (LOAD_L) includes enabling the right amplifier 202*b* (EN_R=1) and disabling the left amplifier 202*a* (EN_L=0) and/or decoupling the left output LP_OUT from the left amplifier 202*a*. When enabled during a resistance measurement mode of operation, the right amplifier 202*b* drives the right output RP_OUT with a first AC measurement signal, which may be a −18 dBv signal having a frequency in a range from about 24 kHz to about 30 kHz. This first AC measurement signal is provided to the right terminal/pad 204*b* and through the right AC coupling capacitor $R\_C_{AC}$ to the right audio port 206*b* and the right output load 208*b* (LOAD_R). In addition, this first AC measurement signal is provided through the right series resistor R_ESD_R to the common drive node PAD_DRIVE by enabling/disabling a plurality of transmission gates within the cross-drive impedance sensing circuit 220. In particular, the transmission gates 210*a*-210*b* are enabled by switching control signals INDS1, INDS2 low-to-high and switching complementary control signals /INDS1 and /INDS2 high-to-low. In addition, the transmission gates 210*c*-210*d* are disabled by switching control signals INDS3, INDS4 high-to-low and switching complementary control signals /INDS3 and /INDS4 low-to-high.

The common drive node PAD_DRIVE is electrically connected to the internal voltage divider network, which is illustrated as including a series arrangement of an internal tap resistor R_INT_TAP, a tap transmission gate 214 (TG_TAP), an electrostatic discharge tap resistor R_ESD_TAP and the varistor RES_BOTTOM. The varistor RES_BOTTOM is electrically connected to a reference terminal which receives a reference voltage VAG, which may be a dc voltage having a magnitude of about ½Vdd, where Vdd is a power supply voltage. This internal voltage divider network is enabled by switching a tap signal TAP low-to-high and the complementary tap signal /TAP high-to-low and thereby turning on the tap transmission gate 214.

The drive node PAD_DRIVE is also connected to the left load voltage divider, which is illustrated as including an internal load resistor R_INT_LOAD, the sense transmission gate 210*a* and the left series resistor R_ESD_L. To reduce error between tap and load voltage divisions, the resistances should be matched as follows:

R_ESD_L=R_ESD_R=R_ESD_TAP

R_INT_TAP=R_INT_LOAD $R_{TG\_TAP}=R_{TG\ 210a}=R_{TG\ 210c}$

Moreover, to further minimize any potential error caused by variable transmission gate resistances, the tap transmission gate 214 (TG_TAP) should extend between the internal tap resistor R_INT_TAP and the ESD tap resistor R_ESD_TAP in the same manner that the sense transmission gate 210*a* (or sense transmission gate 210*c*) extends between the internal load resistor R_INT_LOAD and the left series resistor R_ESD_L (or right series resistor R_ESD_R).

Based on this configuration, the range of load impedances associated with the left output load 208*a* (LOAD_L) can be determined by varying the value of the resistance provided by the varistor (RES_BOTTOM) through specified resistance trip point values in order to detect changes in the value of the output signal COMP_OUT generated by the comparator 212. The output signal COMP_OUT can then be evaluated to determine the magnitude of the load resistance of the left output load 208*a*, using conventional techniques.

An operation to measure a resistance of the right output load 208*b* (LOAD_R) includes enabling the left amplifier 202*a* (EN_L=1) and disabling the right amplifier 202*b* (EN_R=0) and/or decoupling the right output RP_OUT from the right amplifier 202*b*. When enabled during a resistance measurement mode of operation, the left amplifier 202*a* drives the left output LP_OUT with a second AC measurement signal, which is preferably equivalent to the first AC measurement signal. This second AC measurement signal is provided to the left terminal/pad 204*a* and through the left AC coupling capacitor $L\_C_{AC}$ to the left audio port 206*a* and the left output load 208*a* (LOAD_L). In addition, this second AC measurement signal is provided through the left series resistor R_ESD_L to the common drive node PAD_DRIVE by enabling/disabling a plurality of transmission gates within the cross-drive impedance sensing circuit 220. In particular, the transmission gates 210*c*-210*d* are enabled by switching control signals INDS3 and INDS4 low-to-high and switching complementary control signals /INDS3 and /INDS4 high-to-low. The transmission gates 210*a*-210*b* are also disabled by switching control signals INDS1 and INDS2 high-to-low and switching complementary control signals /INDS1 and /INDS2 low-to-high.

The common drive node PAD_DRIVE is connected to the right load voltage divider, which is illustrated as including an internal load resistor R_INT_LOAD, the sense transmission gate 210*c* and the right series resistor R_ESD_R. Based on this configuration, the range of load impedances associated with the right output load 208*b* (LOAD_R) can be determined by varying the value of the resistance provided by the varistor (RES_BOTTOM) through specified resistance trip point values in order to detect changes in the value of the output signal COMP_OUT generated by the comparator 212. The output signal COMP_OUT can then be evaluated to determine the magnitude of the load resistance of the right output load 208*a*.

The cross-drive impedance sensing circuit 220 may also include a kill drive resistance network that is electrically coupled to a second intermediate node of the load voltage divider network (e.g., PAD_SENSE). This kill drive resistance network may be enabled when the cross-drive impedance sensing circuit is measuring whether the left and right output loads 208*a* and 208*b* are electrically shorted together. According to the jack sense circuit 200 of FIG. 2, the kill drive resistance network is illustrated as including a kill drive transmission gate 216 (TG_KD), which is responsive to the kill drive control signals KILL, /KILL, and a kill drive resistor R_ESD_KILL. According to some embodiments of the present invention, the kill drive resistor R_ESD_KILL may have a resistance that is substantially less than an closed-state resistance of the kill drive transmission gate 216 (TG_KD) in order to reduce layout area requirements. For example, the kill drive resistor R_ESD_KILL may have a resistance of about 240 ohms and the closed-state resistance of the kill drive transmission gate 216 may be about 20K ohms when the kill drive control signals KILL=1 and /KILL=0.

An operation to measure a resistance of an output load (208*a* or 208*b*) may include multiple cycles. During a first cycle to measure whether the left output load 208*a* is electrically shorted to the right output load 208*b*, the transmission gates 210*b*, 210*c* and 210*d* are turned off and the transmission gate 210*a* is turned on. In addition, the kill drive transmission gate 216 is turned on and the varistor RES_BOTTOM is set to a first resistance (e.g., 300 ohms). During this first cycle, the kill drive resistor R_ESD_KILL is driven exclusively by the dc reference signal VAG unless a short is present between the right and left output loads 208*a*-208*b*. In particular, this dc reference signal VAG supplies dc current through the resistors RES_BOTTOM, R_ESD_TAP, R_INT_TAP and R_INT_LOAD and maintains the positive input terminal (+) of the comparator 212 at a positive voltage relative to the negative input terminal (−) of the comparator 212, unless a short is present. Moreover, because the reference signal VAG is a dc signal, the capacitor $L\_C_{AC}$ will block dc current flow from the node PAD_SENSE to the left output load 208*a*.

Nonetheless, if the left and right loads LOAD_L and LOAD_R are shorted together, then the left output LP_OUT will also be driven (indirectly) by the right amplifier 202*b*. In particular, this right amplifier 202*b* will drive the left output LP_OUT with the first AC measurement signal (e.g., −18 dBv signal at 24-30 kHz). As illustrated by the cross-drive impedance sensing circuit 220 of FIG. 2, the first AC measurement signal causes an alternating current to pass from the left output LP_OUT through the resistors R_ESD_L and R_ESD_KILL and the transmission gates 210*a* and 216 (TG_KD). This alternating current causes an alternating voltage to be present on the sense node PAD_SENSE, at the negative input terminal (−) of the comparator 212 and at the output COMP_OUT of the comparator 212. The presence of an alternating square-wave voltage at the output of the comparator 212 reflects the presence of a short between the left and right output loads and the presence of a fixed voltage (e.g., Vdd) at the output of the comparator 212 reflects a lack of a short between the output loads. The presence of the short may identify that a microphone has been plugged into the CODEC audio jack.

Thereafter, during a second cycle to measure the left output load 208*a*, the transmission gates 210*a* and 210*b* are turned on and the transmission gates 210*c* and 210*d* are turned off. In addition, the kill drive transmission gate 216 is turned off and the varistor RES_BOTTOM is set to a second resistance (e.g., 2000 ohms). Similarly, during a third cycle, the conditions of the second cycle are maintained, but the varistor RES_BOT- TOM is set to a third resistance (e.g., 1,275 ohms). During a fourth cycle, the conditions of the second cycle are maintained, but the varistor RES_BOTTOM is set to a fourth resistance (e.g., 300 ohms). During each of these latter cycles, the output COMP_OUT of the comparator 212 is monitored to detect an appropriate trip point associated with the left output load 208*a*. However, if the results of the first cycle indicated a short between the output loads, then the results of the second, third and fourth cycles are disregarded.

Thereafter, during an optional first cycle to confirm whether the right output load 208*a* is electrically shorted to the left output load 208*b*, the transmission gates 210*a*, 210*b* and 210*d* are turned off and the transmission gate 210*c* is turned on. In addition, the kill drive transmission gate 216 is turned on and the varistor RES_BOTTOM is set to a first resistance (e.g., 300 ohms). During this first cycle, the kill drive resistor R_ESD_KILL is driven exclusively by the dc reference signal VAG in the event a short is not present between the output loads. This reference signal VAG supplies dc current through the resistors RES_BOTTOM, R_ESD_TAP, R_INT_TAP and R_INT_LOAD and maintains the positive input terminal (+) of the comparator 212 at a positive voltage relative to the negative input terminal (−) of the comparator 212. But, because the reference signal VAG is a dc signal, the capacitor R_$C_{AC}$ will block dc current flow from the node PAD_SENSE to the right output load 208*b*.

Nonetheless, if the right and left loads LOAD_R and LOAD_L are shorted together, then the right output RP_OUT will also be driven (indirectly) by the left amplifier 202*a*. In particular, this left amplifier 202*a* will drive the right output RP_OUT with the second AC measurement signal (e.g., −18 dBv signal at 24-30 kHz). As illustrated by the cross-drive impedance sensing circuit 220 of FIG. 2, the second AC measurement signal causes an alternating current to pass from the right output RP_OUT through the resistors R_ESD_R and R_ESD_KILL and the transmission gates 210*c* and 216 (TG_KD). This alternating current causes an alternating voltage to be present on the sense node PAD_SENSE, at the negative input terminal (−) of the comparator 212 and at the output COMP_OUT of the comparator 212. The presence of an alternating square-wave voltage at the output of the comparator 212 reflects the presence of a short between the output loads and the presence of a fixed voltage (e.g., Vdd) at the output of the comparator 212 reflects a lack of a short between the output loads. The presence of the short may verify that a microphone has been plugged into the CODEC audio jack.

A second cycle to measure the right output load 208*b* may then be performed by turning on the transmission gates 210*c* and 210*d*, turning off the transmission gates 210*a* and 210*b*, turning off the kill drive transmission gate 216 and setting the varistor RES_BOTTOM to the second resistance (e.g., 2000 ohms). During a third cycle, the conditions of the second cycle are maintained, but the varistor RES_BOTTOM is set to a third resistance (e.g., 1,275 ohms). During a fourth cycle, the conditions of the second cycle are maintained, but the varistor RES_BOTTOM is set to a fourth resistance (e.g., 300 ohms). Again, during each of these cycles, the output COMP_OUT of the comparator 212 is monitored to detect an appropriate trip point associated with the right output load 208*b*, but is disregarded if a short was previously detected.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit device, comprising:
- a first driver having a first output;
- a second driver having a second output;
- a cross-drive impedance sensing circuit electrically coupled to the first and second outputs of said first and second drivers, said cross-drive impedance sensing circuit configured to measure a first resistance of a first output load electrically coupled to the first output in response to a second test signal generated by said second driver and further configured to measure a second resistance of a second output load electrically coupled to the second output in response to a first test signal generated by said first driver.

2. The integrated circuit device of claim 1, wherein said cross-drive impedance sensing circuit is configured to disable said first driver when measuring the first resistance of the first output load and is further configured to disable said second driver when measuring the second resistance of the second output load.

3. The integrated circuit device of claim 2, wherein said cross-drive impedance sensing circuit is further configured to measure the first resistance of the first output load when the first output load is electrically coupled by a first ac coupling capacitor to the first output; and wherein said cross-drive impedance sensing circuit is further configured to measure the second resistance of the second output load when the second output load is electrically coupled by a second ac coupling capacitor to the second output.

4. The integrated circuit device of claim 1, wherein said cross-drive impedance sensing circuit is further configured to measure the first resistance of the first output load when the first output load is electrically coupled by a first ac coupling capacitor to the first output; and wherein said cross-drive impedance sensing circuit is further configured to measure the second resistance of the second output load when the second output load is electrically coupled by a second ac coupling capacitor to the second output.

5. The integrated circuit device of claim 4, wherein said cross-drive impedance sensing circuit comprises:
- a load voltage divider network configured to establish a first load voltage divider between a drive node of said cross-drive impedance sensing circuit and the first output when said cross-drive impedance sensing circuit is configured to measure the first resistance and further configured to establish a second load voltage divider between the drive node and the second output when said cross-drive impedance sensing circuit is configured to measure the second resistance.

6. The integrated circuit device of claim 5, wherein said cross-drive impedance sensing circuit further comprises:
- an internal voltage divider network configured to establish an internal voltage divider between the drive node and a reference terminal; and
- a comparator having first and second inputs electrically connected to a first intermediate node in said internal voltage divider network and a first intermediate node in said load voltage divider network, respectively.

7. The integrated circuit device of claim 1, wherein said cross-drive impedance sensing circuit comprises:
- a load voltage divider network configured to establish a first load voltage divider between a drive node of said cross-drive impedance sensing circuit and the first output when said cross-drive impedance sensing circuit is configured to measure the first resistance and further configured to establish a second load voltage divider between the drive node and the second output when said cross-drive impedance sensing circuit is configured to measure the second resistance.

8. The integrated circuit device of claim 7, wherein said cross-drive impedance sensing circuit further comprises:

an internal voltage divider network configured to establish an internal voltage divider between the drive node and a reference terminal; and a comparator having first and second inputs electrically connected to a first intermediate node of said internal voltage divider network and a first intermediate node of said load voltage divider network, respectively.

9. The integrated circuit device of claim 8, wherein said internal voltage divider network comprises a varistor; and wherein said cross-drive impedance sensing circuit is configured to change a resistance of the varistor when measuring the first and second resistances.

10. The integrated circuit device of claim 1, wherein said cross-drive impedance sensing circuit is configured to decouple the output of said first driver from the first output when measuring the resistance of the first output load and further configured to decouple the output of said second driver from the second output when measuring the resistance of the second output load.

11. The integrated circuit device of claim 8, wherein said cross-drive impedance sensing circuit further comprises a kill drive resistance network electrically coupled to a second intermediate node of said load voltage divider network.

12. The integrated circuit device of claim 11, wherein said cross-drive impedance sensing circuit is configured to enable said kill drive resistance network when said cross-drive impedance sensing circuit is configured to measure whether the first and second output loads are electrically shorted together.

13. The integrated circuit device of claim 11, wherein said kill drive resistance network comprises:

a kill drive transmission gate having a first terminal electrically coupled to the second intermediate node; and a kill drive resistor having a first terminal electrically coupled to a second terminal of said kill drive transmission gate.

14. The integrated circuit device of claim 13, wherein an closed-state resistance of said kill drive transmission gate is greater than a resistance of said kill drive resistor.

15. The integrated circuit device of claim 1, wherein said cross-drive impedance sensing circuit is further configured to measure whether the first and second output loads are electrically shorted together when measuring the first resistance of a first output load electrically coupled to the first output.

16. An audio system, comprising:

a CODEC audio jack having left and right audio ports;

a jack sense circuit electrically coupled to said CODEC audio jack, said jack sense circuit comprising:

left and right amplifiers; and a cross-drive impedance sensing circuit electrically coupled to the left and right audio ports and said left and right amplifiers, said cross-drive impedance sensing circuit configured to measure a resistance of a left output load electrically coupled the left audio port in response to a test signal generated by said right amplifier and further configured to measure a resistance of a right output load electrically coupled the right audio port in response to a test signal generated by said left amplifier.

17. The audio system of claim 16, wherein said cross-drive impedance sensing circuit is configured to disable said left amplifier when measuring the resistance of the left output load and is further configured to disable said right amplifier when measuring the resistance of the right output load.

18. The audio system of claim 17, wherein said cross-drive impedance sensing circuit is further configured to measure the resistance of the left output load when the left output load is electrically coupled by a left ac coupling capacitor to the left output; and wherein said cross-drive impedance sensing circuit is further configured to measure the resistance of the right output load when the right output load is electrically coupled by a right ac coupling capacitor to the right output.

19. The audio system of claim 16, wherein said cross-drive impedance sensing circuit comprises:

a load voltage divider network configured to establish a left load voltage divider between a drive node of said cross-drive impedance sensing circuit and the left output when said cross-drive impedance sensing circuit is configured to measure the resistance of the left output load and further configured to establish a right load voltage divider between the drive node and the right output when said cross-drive impedance sensing circuit is configured to measure the resistance of the right output load.

20. The audio system of claim 19, wherein said cross-drive impedance sensing circuit further comprises:

an internal voltage divider network configured to establish an internal voltage divider between the drive node and a reference terminal; and a comparator having first and second inputs electrically connected to a first intermediate node in said internal voltage divider network and a first intermediate node in said load voltage divider network, respectively.

21. The audio system of claim 20, wherein said internal voltage divider network comprises a varistor; and wherein said cross-drive impedance sensing circuit is configured to change a resistance of the varistor when measuring the resistances of the left and right loads.

22. The audio system of claim 20, wherein said cross-drive impedance sensing circuit further comprises a kill drive resistance network electrically coupled to a second intermediate node of said load voltage divider network.

23. The audio system of claim 22, wherein said cross-drive impedance sensing circuit is configured to enable said kill drive resistance network when said cross-drive impedance sensing circuit is configured to measure whether the first and second output loads are electrically shorted together.

24. The integrated circuit device of claim 22, wherein said kill drive resistance network comprises:

a kill drive transmission gate having a first terminal electrically coupled to the second intermediate node; and a kill drive resistor having a first terminal electrically coupled to a second terminal of said kill drive transmission gate.

25. The integrated circuit device of claim 24, wherein an closed-state resistance of said kill drive transmission gate is greater than a resistance of said kill drive resistor.

* * * * *